US008777493B2

(12) United States Patent
Kwasniewski et al.

(10) Patent No.: US 8,777,493 B2
(45) Date of Patent: Jul. 15, 2014

(54) AXLE ASSEMBLY HAVING A BEARING ADJUSTER MECHANISM

(75) Inventors: Dale L. Kwasniewski, Galesburg, MI (US); Sreenivasa L. Nayak, Bangalore (IN); Larry P. Wagle, Boyne Falls, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 125 days.

(21) Appl. No.: 13/529,341

(22) Filed: Jun. 21, 2012

(65) Prior Publication Data

US 2013/0343691 A1 Dec. 26, 2013

(51) Int. Cl.
*F16C 35/06* (2006.01)
*F16C 35/07* (2006.01)

(52) U.S. Cl.
USPC .......................... 384/583; 384/585; 384/563

(58) Field of Classification Search
CPC ........ F16C 35/06; F16C 35/067; F16C 35/07; F16C 35/077
USPC ........ 384/519, 563, 583, 585, 517; 74/606 R; 475/230, 245–248, 253
See application file for complete search history.

(56) References Cited

U.S. PATENT DOCUMENTS

| | | | | |
|---|---|---|---|---|
| 3,260,132 | A * | 7/1966 | West et al. | 74/609 |
| 5,046,870 | A * | 9/1991 | Ordo | 384/563 |
| 7,108,428 | B2 | 9/2006 | Ason et al. | |
| 7,794,153 | B2 * | 9/2010 | Szczepanski et al. | 384/583 |
| 8,475,320 | B2 * | 7/2013 | Kwon | 475/230 |
| 2003/0066398 | A1 | 4/2003 | Tuthill | |
| 2012/0207420 | A1 * | 8/2012 | Bostwick | 384/537 |

FOREIGN PATENT DOCUMENTS

| | | |
|---|---|---|
| JP | 62 153414 U | 9/1987 |
| JP | 0217220 A | 1/1990 |
| WO | 2006020694 A2 | 2/2006 |

OTHER PUBLICATIONS

European Patent Office, Extended Search Report for the corresponding European Patent Application No. 13171887.6 dated Sep. 4, 2013.
"PreSet Plus" brochure, Consolidated Metco, Inc., Feb. 2011, Vancouver, WA.

* cited by examiner

*Primary Examiner* — Alan B Waits
(74) *Attorney, Agent, or Firm* — Brooks Kushman P.C.

(57) ABSTRACT

An axle assembly having a housing, a bearing, and a bearing adjuster mechanism. The bearing adjuster mechanism may include an adjuster ring and a lock ring. The adjuster ring may have a set of teeth and exert a preload force upon the bearing. The lock ring may include a lock tab portion that extends between two teeth and engages a lock ring positioning feature disposed on the housing to inhibit rotation of the adjuster ring.

20 Claims, 3 Drawing Sheets

Section A-A

Section A-A

US 8,777,493 B2

AXLE ASSEMBLY HAVING A BEARING ADJUSTER MECHANISM

TECHNICAL FIELD

The present application relates to an axle assembly having a bearing adjuster mechanism.

BACKGROUND

An axle assembly with a bearing adjustment mechanism is disclosed in U.S. Pat. No. 7,108,428.

SUMMARY

In at least one embodiment an axle assembly is provided. The axle assembly may include a housing, a bearing, and a bearing adjuster mechanism. The housing may have a hole and a lock ring positioning feature. The bearing may be disposed in the hole. The bearing adjuster mechanism may include an adjuster ring and a lock ring. The adjuster ring may be disposed in the hole and may exert a preload force upon the bearing. The adjuster ring may have a set of teeth. The lock ring may have a snap ring portion and a lock tab portion that extends from the snap ring portion. The snap ring portion may be at least partially disposed between the adjuster ring and the bearing. The lock tab portion may extend between two adjacent members of the set of teeth and engage the lock ring positioning feature to inhibit rotation of the adjuster ring.

In at least one embodiment an axle assembly is provided. The axle assembly may include a housing, a bearing, and a bearing adjuster mechanism. The housing may have a hole and a lock ring positioning feature. The hole may extend along an axis. The lock ring positioning feature may be disposed outside of the hole. The bearing may be disposed in the hole and may engage the housing. The bearing adjuster mechanism may include an adjuster ring and a lock ring. The adjuster ring may be disposed in the hole and may engage the housing. The adjuster ring may have a set of teeth that extend toward the axis. The lock ring may have a snap ring portion and a lock tab portion that extends from the snap ring portion. The snap ring portion may engage multiple members of the set of teeth to position the lock ring with respect to the adjuster ring. The lock tab portion may extend between two adjacent members of the set of teeth and may be received in the lock ring positioning feature to inhibit rotation of the adjuster ring.

In at least one embodiment an axle assembly is provided. The axle assembly may include a housing, an axle coupling, a bearing, an adjuster ring, and a bearing adjuster mechanism that has an adjuster ring and a lock ring. The housing may have a hole that extends along an axis and a lock ring positioning feature that may be disposed proximate the hole. The axle coupling, bearing, and adjuster ring may be disposed in the hole. The adjuster ring may have a first surface that engages the bearing, a second surface disposed opposite the first surface, and a set of teeth. The set of teeth may be disposed between the first and second surfaces and may extend toward the axis. The lock ring may include a snap ring portion and a lock tab portion that may engage different members of the set of teeth. The lock tab portion may engage the lock ring positioning feature to inhibit rotation of the adjuster ring.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
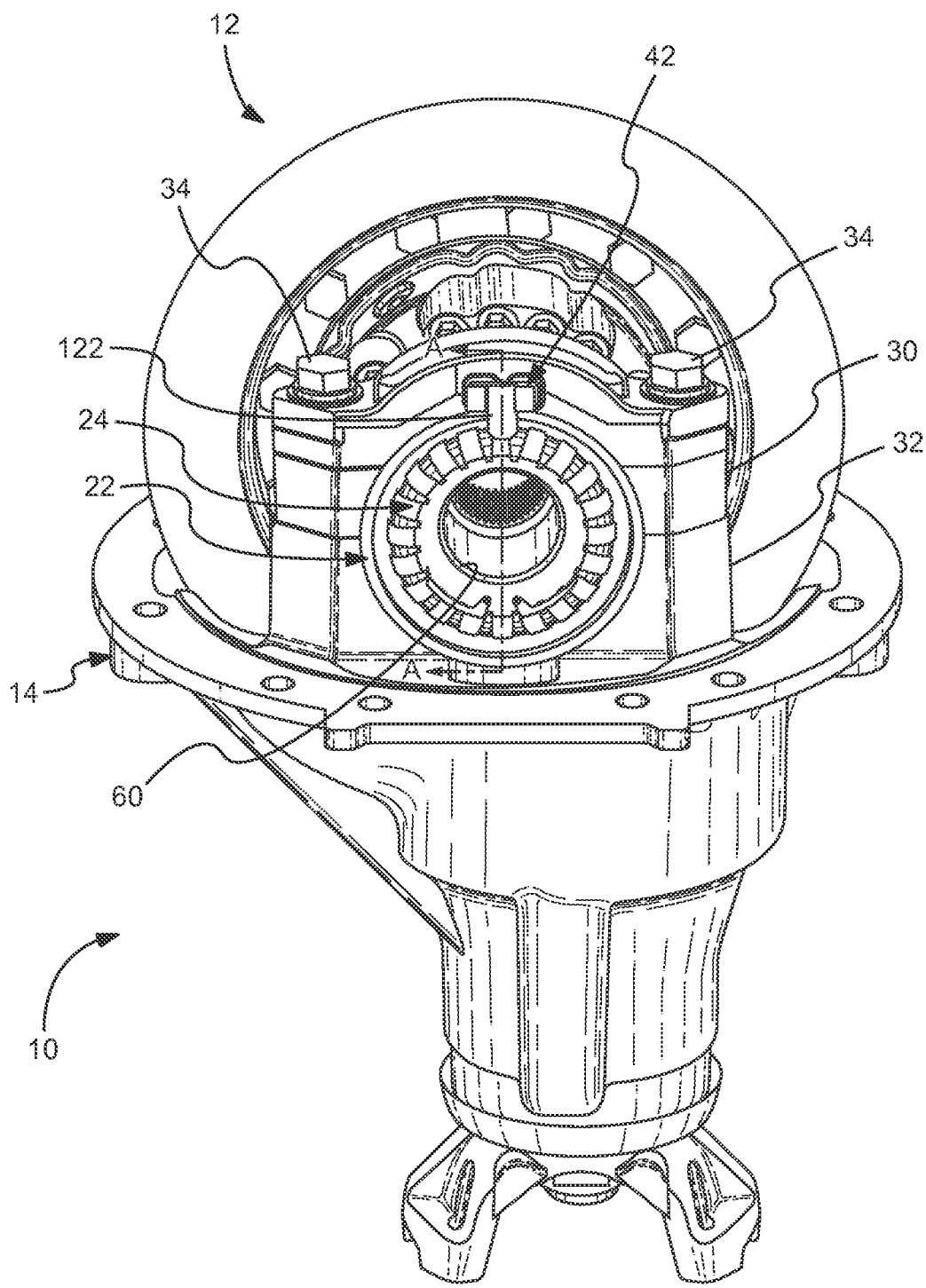
FIG. 1 is a perspective view of a portion of an axle assembly having a bearing adjuster mechanism.
Figure 2:
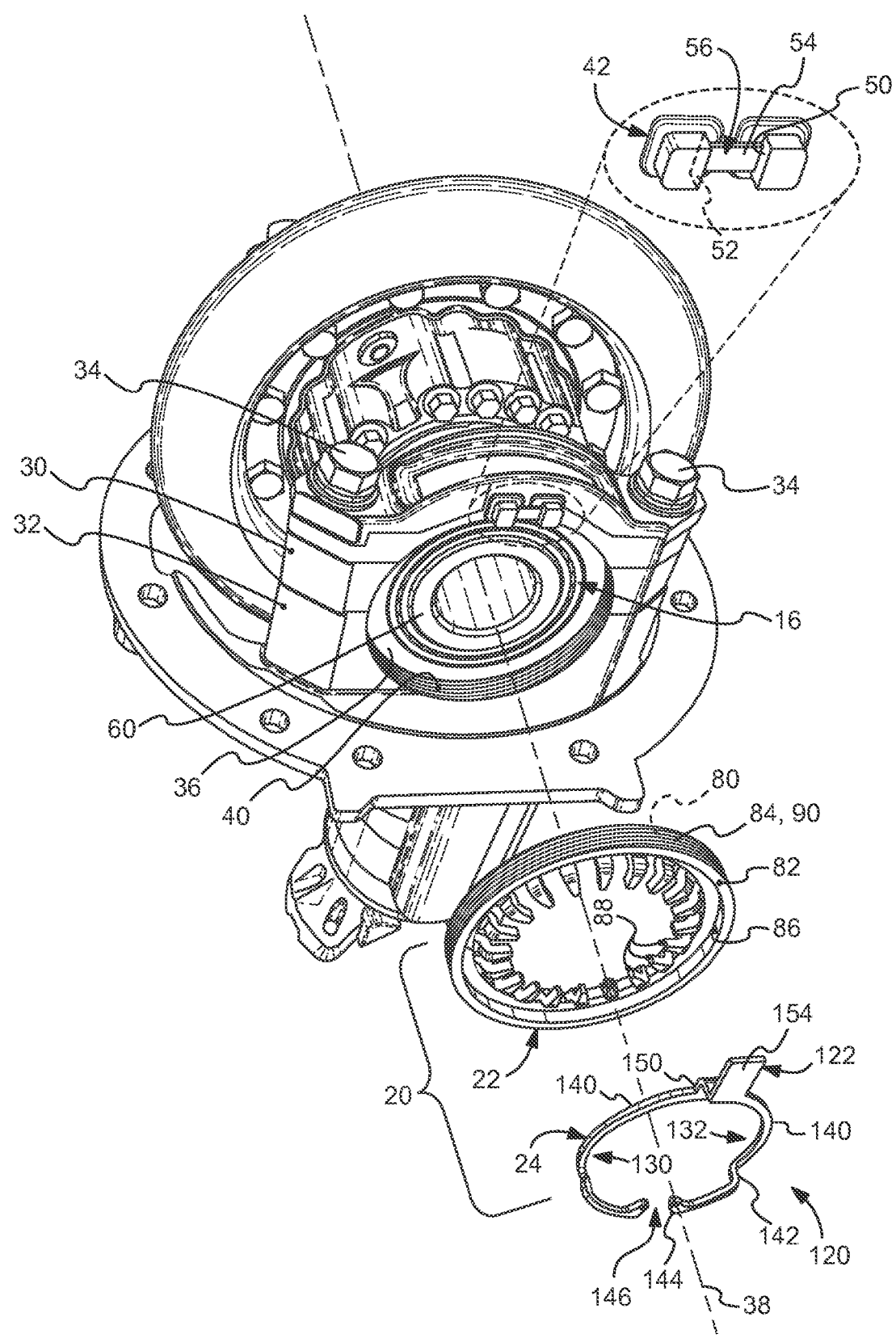
FIG. 2 is a partially exploded view of the axle assembly shown in FIG. 1.
Figure 3:
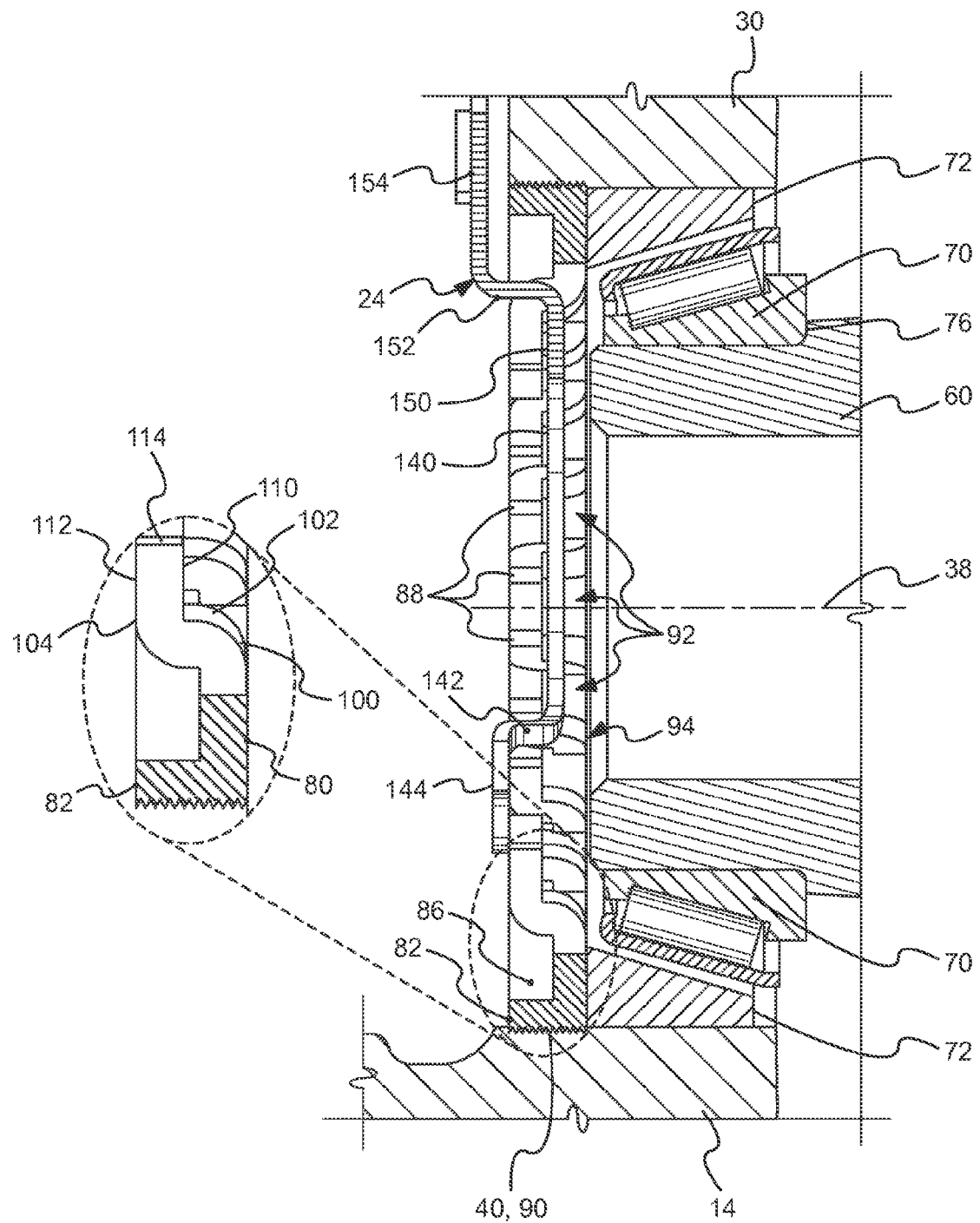
FIG. 3 is a section view of axle assembly along section line A-A.

Referring to FIG. 1, an exemplary axle assembly 10 is shown. The axle assembly 10 may be provided as part of a vehicle, such as a motor vehicle like a truck, bus, farm equipment, military transport or weaponry vehicle, or cargo loading equipment for land, air, or marine vessels.

The axle assembly 10, which may also be called a differential or transaxle, may be a drive axle assembly that may include a differential assembly 12. The differential assembly 12 may receive power or torque via an input, such as a drive shaft or prop shaft, and may transfer power or torque to a pair of axle shafts (not shown) that may be coupled to at least one traction wheel assembly. The differential assembly 12 may allow the axle shafts to rotate at different speeds. The differential assembly 12 may be disposed inside and/or on a housing 14 of the axle assembly 10 and may be rotatably mounted on a pair of bearings 16. The axle assembly 10 may also include a bearing adjuster mechanism 20 that may exert a preload force upon at least one bearing 16. In addition, the bearing adjuster mechanism 20 may help position the differential assembly 12 to provide a desired gear alignment and/or to help absorb gear service loads. In at least one embodiment, the bearing adjuster mechanism 20 may include an adjuster ring 22 and a lock ring 24.

The housing 14 may receive the bearing adjuster mechanism 20 and may support the differential assembly 12. The housing 14 may include one or more components. For example, the housing 14 may include a bearing cap 30 that may be fastened to another housing component, such as a differential carrier 32, in one or more embodiments. The bearing cap 30 may be fastened to the differential carrier 32 with one or more fasteners 34, such as a bolt. The housing 14 may at least partially define a hole 36. The hole 36 may be disposed along an axis 38 and may be configured to receive an axle shaft. The housing 14 may include a threaded region 40 that may be disposed in the hole 36. For example, at least a portion of an inside surface of the bearing cap 30 and differential carrier 32 that faces toward the axis 38 may have threaded region 40 that includes one or more threads that extend at least partially around the axis 38.

The housing 14 may also include a lock ring positioning feature 42. The lock ring positioning feature 42 may help position and inhibit movement of the lock ring 24 as will be discussed in more detail below. In FIG. 1, the lock ring positioning feature 42 is provided on the bearing cap 30, but may be provided on the differential carrier 32 or another portion of the housing 14 in one or more embodiments. The lock ring positioning feature 42 may protrude from a side surface 44 of the housing 14 that faces away from a ring gear of the differential assembly 12. In at least one embodiment, the lock ring positioning feature 42 may include a first surface 50, a second surface 52, and a third surface 54 that cooperate to at least partially define a slot 56 that may receive a portion of the lock ring 24. The first surface 50 may be disposed opposite and may be spaced apart from the second surface 52. The third surface 54 may extend from the first surface 50 to the second surface 52.

The bearing 16 may be disposed in the hole 36 and may rotatably support the differential assembly 12 or a component thereof, such as an axle coupling 60 that may receive an axle shaft. The bearing 16 may engage and may be preloaded against the axle coupling 60 to inhibit axial movement of the bearing 16. In at least one embodiment, the bearing 16 may extend around the axis 38 and may include an inner race 70 and an outer race 72.

The inner race 70 may engage a component of the differential assembly 12, such as a circumference of the axle coupling 60. In addition, a side surface 74 of the inner race 70 may engage a step surface 76 of the axle coupling 60 to inhibit axial movement of the inner race 70. The step surface 76 may extend radially with respect to the axis 38.

The outer race 72 may be disposed opposite the inner race 70. The outer race 72 may engage the housing 14. For instance, the outer race 72 may engage the bearing cap 30 and/or the differential carrier 32. In addition, the outer race 72 and may be spaced apart from the threaded region 40.

The adjuster ring 22 may be configured to exert force upon the bearing 16 to set a desired bearing preload. In an axle assembly application, the differential assembly 12 may include a ring gear and a pinion that engages the ring gear. The ring gear may be positioned with respect to the pinion to attain a desired contract pattern. Next, the adjuster ring 22 may be rotated about the axis 38 to impart a desired preload force against the bearing 16. The position of the adjuster ring 22 may be set or adjusted by hand without specialized assembly tools in one or more embodiments.

The adjuster ring 22 may include a first surface 80, a second surface 82, an outside surface 84, an inside surface 86, and a set of teeth 88.

The first surface 80 may face toward and may engage the bearing 16. For example, the first surface 80 may engage the outer race 72. The first surface 80 may be substantially planar in one or more embodiments.

The second surface 82 may be disposed opposite the first surface 80. The second surface 82 may be substantially planar and may be disposed substantially parallel to the first surface 80 in one or more embodiments.

The outside surface 84 may extend from the first surface 80 to the second surface 82. The outside surface 84 may at least partially define an outside circumference of the adjuster ring 22 and may be at least partially threaded or include a threaded portion 90. As such, the threaded portion 90 may mate with the threaded region 40 of the housing 14 to permit the adjuster ring 22 to be rotated about the axis 38 to adjust the bearing preload.

The inside surface 86 may be disposed opposite the outside surface 84. The set of teeth 88 may extend from the inside surface 86. The members of the set of teeth 88 may be spaced apart from the axle shaft and may be spaced apart from the axle coupling 60 so as to not interfere with rotation of the axle shaft. In addition, the members of the set of teeth 88 may be spaced apart from each other and may extend toward the axis 38. The teeth 88 may have any suitable configuration and may be configured as any bump, protrusion, or the like that may at least partially define a hole, gap, or opening that may receive a portion of the lock ring 24. In at least one embodiment, the teeth 88 may be tapered or become narrower in a direction extending from the inside surface 86 toward the axis 38 so that a gap 92 between adjacent teeth may have a substantially constant width. Also, each tooth 88 may be disposed between the first and second surfaces 80, 82 or planes in which the first and second surfaces 80, 82 are disposed. Each tooth 88 may be configured such that a cavity 94 is provided between the teeth 88 and the bearing 16 and/or axle coupling 60 for receiving a portion of the lock ring 24. In at least one embodiment, each tooth 88 may include a first tooth portion 100, a second tooth portion 102, and a third tooth portion 104.

The first tooth portion 100 may extend radially from the inside surface 86 toward the axis 38. The first tooth portion 100 may be disposed adjacent to the first surface 80 or closer to the first surface 80 than the second surface 82 in one or more embodiments.

The second tooth portion 102 may extend from an end of the first tooth portion 100 toward the second surface 82. The second tooth portion 102 may extend substantially parallel to the axis 38 or at an angle with respect to the axis 38 in one or more embodiments. The second tooth portion 102 may be spaced apart the inside surface 86 in one or more embodiments. Alternatively, the second tooth portion 102 could extend from the inside surface 86.

The third tooth portion 104 may extend from an end of the second tooth portion 102 toward the axis 38. The third tooth portion 104 may include a first tooth surface 110, a second tooth surface 112, and an end surface 114. The first tooth surface 110 may face toward the first surface 80. The second tooth surface 112 may be disposed opposite the first tooth surface 110 and face toward the second surface 82. The end surface 114 may extend from the first tooth surface 110 to the second tooth surface 112. The end surface 114 may be disposed closer to axis 38 than the first tooth portion 100 and the second tooth portion 102. In addition, the third tooth portion 104 may be disposed closer to the second surface 82 than the first tooth portion 100 in one or more embodiments.

The lock ring 24 may be configured to inhibit rotation of the adjuster ring 22. The lock ring 24 may include a snap ring portion 120 and a lock tab portion 122.

The snap ring portion 120 may be disposed proximate the adjuster ring 22 and may extend around the axis 38. The snap ring portion 120 may include a first arm 130 and a second arm 132. The first and second arms 130, 132 may be curved or extend along an arc and may be generally configured as mirror images of each other. As such, the first and second arms 130, 132 may cooperate to define an opening through which the axle shaft may extend. The first and second arms 130, 132 may flex or may be squeezed toward each other to facilitate installation. In at least one embodiment, the first and second arms 130, 132 may be spaced apart from the second tooth portion 102, or may have an outside diameter that is less than an inside diameter of the second tooth portion 102. The first and second arms 130, 132 may each include a first arm portion 140, a second arm portion 142, and a third arm portion 144.

The first arm portion 140 may be disposed in the cavity 94 between the teeth 88 and the bearing 16 and/or axle coupling 60.

The second arm portion 142 may connect the first arm portion 140 to the third arm portion 144. The second arm portion 142 may extend between two adjacent teeth 88. In at least one embodiment, the second arm portion 142 may extend generally parallel to the axis 38 and may be spaced apart from the teeth 88.

The third arm portion 144 may extend from an end of the second arm portion 142. The third arm portion 144 may be curved similar to the first arm portion 140. In addition, the third arm portion 144 may be located adjacent to and/or may engage the second tooth surface 112 of one or more teeth 88 in one or more embodiments. As such, the first arm portion 140 and the third arm portion 144 may be disposed on opposite sides of members of the set of teeth 88. The third arm portion 144 of the first arm 130 may be spaced apart from the third arm portion of the second arm 132, thereby providing a gap 146 that permits deflection of the first and second arms 130, 132.

The lock tab portion 122 may extend from the snap ring portion 120 and may be configured to engage the housing 14 to inhibit rotation of the adjuster ring 22. In at least one embodiment, the lock tab portion 122 may extend between adjacent teeth 88 on the lock ring 24 and engage the housing 14 to inhibit rotational movement of the lock ring 24 and the adjustment ring 28 about the axis 38. In at least one embodiment, the lock tab portion 122 may include a first tab portion 150, a second tab portion 152, and a third tab portion 154.

The first tab portion 150 may extend from the snap ring portion 120. The first tab portion 150 may be located opposite the gap 146 near or at the intersection of the first and second arms 130, 132. In addition, the first tab portion 150 extend radially away from the axis 38 and toward the inside surface 86 of the adjuster ring 22 in one or more embodiments.

The second tab portion 152 may extend from an end of the first tab portion 150. The second tab portion 152 may extend away from the bearing 16 and may extend between adjacent teeth 88 on the adjuster ring 22. In at least one embodiment, the second tab portion 152 may extend substantially perpendicular to the first tab portion 150 and/or the third tab portion 154. The second tab portion 152 may engage adjacent teeth 88 to inhibit rotation of the lock ring 24 about the axis 38.

The third tab portion 154 may extend from an end of the second tab portion 152. The third tab portion 154 may extend away from the axis 38 and may be received in the lock ring positioning feature 42. For example, the third tab portion 154 may extend outwardly past the outside surface 84 of the adjuster ring 22 and may be disposed in the slot 56. As such, the third tab portion 154 may engage the first surface 50, the second surface 52, and optionally the third surface 54 of the lock ring positioning feature 42 to inhibit rotation of the lock ring 24 about the axis 38. The third tab portion 154 may be received in the slot 56, but may not be fixedly disposed or fastened to the lock ring positioning feature 42. For example, the third tab portion 154 may not be fixedly coupled to the housing 14 or lock ring positioning feature 42 with a fastener, such as a bolt, screw, or clip. Since the lock ring 24 is inhibited from rotating about the axis 38, the adjuster ring 22 is also inhibited from rotating about the axis 38 due to the engagement of the lock tab portion 122 with the teeth 88 of the adjuster ring 22.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a housing that has a hole and a lock ring positioning feature;
a bearing disposed in the hole; and
a bearing adjuster mechanism that includes:
an adjuster ring that is disposed in the hole and exerts a preload force upon the bearing, wherein the adjuster ring has a set of teeth; and
a lock ring having a snap ring portion in a cavity that is provided between the bearing and set of teeth and a lock tab portion that extends from the snap ring portion;
wherein the snap ring portion is at least partially disposed between the adjuster ring and the bearing and wherein the lock tab portion extends between two adjacent members of the set of teeth and engages the lock ring positioning feature to inhibit rotation of the adjuster ring.

2. The axle assembly of claim 1 wherein the housing includes a bearing cap and a differential carrier that cooperate to define the hole.

3. The axle assembly of claim 2 wherein the lock ring positioning feature is disposed on the bearing cap.

4. The axle assembly of claim 3 wherein the lock ring positioning feature protrudes from a side surface of the bearing cap.

5. The axle assembly of claim 1 wherein the lock ring positioning feature includes a first surface, a second surface, and a third surface that extends from the first surface to the second surface, wherein the first, second, and third surfaces cooperate to define a slot that receives the lock tab portion.

6. The axle assembly of claim 1 wherein the lock tab portion is not fixedly coupled to the lock ring positioning feature.

7. An axle assembly comprising:
a housing that has a hole that extends along an axis and a lock ring positioning feature disposed outside of the hole;
a bearing that is disposed in the hole and engages the housing; and
a bearing adjuster mechanism that includes:
an adjuster ring that is disposed in the hole and engages the housing, wherein the adjuster ring has a set of teeth that extend toward the axis; and
a lock ring having a snap ring portion and a lock tab portion that extends from the snap ring portion;
wherein the snap ring portion engages multiple members of the set of teeth to position the lock ring with respect to the adjuster ring and the lock tab portion extends between two adjacent members of the set of teeth and is received in the lock ring positioning feature to inhibit rotation of the adjuster ring.

8. The axle assembly of claim 7 wherein the housing includes a threaded region and wherein the adjuster ring includes a threaded portion that mates with the threaded region.

9. The axle assembly of claim 7 wherein the lock tab portion includes a first tab portion that extends away from the axis.

10. The axle assembly of claim 9 wherein the lock tab portion includes a second tab portion that extends from an end of the first tab portion and between two adjacent members of the set of teeth.

11. The axle assembly of claim 10 wherein the lock tab portion includes a third tab portion that extends from an end of the second tab portion and away from the axis, wherein the third tab portion is received in the lock ring positioning feature.

12. The axle assembly of claim 7 wherein the snap ring portion includes a first arm having a first arm portion that is disposed between the adjuster ring and the bearing.

13. The axle assembly of claim 12 wherein the snap ring portion includes a second arm portion that extends from an end of the first arm portion and between two adjacent members of the set of teeth through which the lock tab portion does not extend.

14. The axle assembly of claim 13 wherein the snap ring portion includes a third arm portion that extends from an end of the second arm portion, wherein the third arm portion engages at least one member of the set of teeth.

15. The axle assembly of claim 14 wherein the first and third arm portions are disposed on opposite sides of members of the set of teeth.

16. The axle assembly of claim 7 wherein the snap ring portion includes a first arm and a second arm disposed opposite the first arm, wherein the first and second arms extend along an arc.

17. An axle assembly comprising:
- a housing having a hole that extends along an axis and a lock ring positioning feature disposed proximate the hole;
- an axle coupling disposed in the hole;
- a bearing disposed in the hole;
- a bearing adjuster mechanism that includes:
  - an adjuster ring that is disposed in the hole and has a first surface that engages the bearing, a second surface disposed opposite the first surface, and a set of teeth that are disposed between the first and second surfaces and extend toward the axis; and
  - a lock ring having a snap ring portion and a lock tab portion;
- wherein the snap ring portion and the lock tab portion engage different members of the set of teeth and wherein the lock tab portion engages the lock ring positioning feature to inhibit rotation of the adjuster ring.

18. The axle assembly of claim 17 wherein at least one member of the set of teeth includes a first tooth portion that extends from an inside surface of the adjuster ring.

19. The axle assembly of claim 18 further comprising a second tooth portion that extends from an end of the first tooth portion toward the second surface.

20. The axle assembly of claim 19 further comprising a third tooth portion that extends from an end of the second tooth portion toward the axis.

* * * * *